United States Patent [19]
Cherbourg et al.

[11] 3,993,338
[45] Nov. 23, 1976

[54] SLIDING DOOR RELEASE AND ACTUATING CONTROL DEVICE

[75] Inventors: Robert Cherbourg; Guy Soetaert, both of Boulogne-Billancourt, France

[73] Assignees: Regie Nationale des Usines Renault, Boulogne-Billancourt; Automobiles Peugeot, Paris, both of France

[22] Filed: July 28, 1975

[21] Appl. No.: 599,339

[30] Foreign Application Priority Data

July 31, 1974 France .............................. 74.26567

[52] U.S. Cl. ...................... 292/336.3; 292/DIG. 31; 292/DIG. 49
[51] Int. Cl.² ........................................ E05C 21/00
[58] Field of Search ................. 292/336.3, DIG. 31, 292/166, 167, 223, DIG. 49

[56] References Cited
UNITED STATES PATENTS

| | | | |
|---|---|---|---|
| 2,479,921 | 8/1949 | Gander | 292/223 |
| 3,249,379 | 5/1966 | Ross | 292/166 |
| 3,743,336 | 7/1973 | Andrews | 292/DIG. 31 |

*Primary Examiner*—Richard E. Moore

[57] ABSTRACT

This device for releasing and actuating a sliding door is of the type comprising a handle-forming plate-flush mounted in the door volume by means of a double joint. This control plate is thus pivoted at two points located preferably in the end portions of the plate to permit the door opening and closing movements.

1 Claim, 4 Drawing Figures

SLIDING DOOR RELEASE AND ACTUATING CONTROL DEVICE

This invention relates in general to control devices for releasing and actuating a sliding door by means of a double-joint plate.

Up to now, control devices for opening sliding doors from the outside consisted as a rule of pivoted handles or push-button means. In these known devices the handles are not incorporated in the door volume, as in some known flush-mounting or fitting devices.

It is the essential object of the present invention to replace the external projecting handle or push-button for releasing and actuating a sliding door with a plate adapted to be flush-fitted or substantially flush-fitted in the door case or volume, and to act on the one hand as a means for controlling the door lock or locks and on the other hand as a traction handle for actuating the sliding door laterally in translation. To permit this last-mentioned operation, the control plate must obviously be so shaped and disposed that it can be gripped from both sides or ends; therefore, this control plate must compulsorily comprise two joints fulcra, or pivot points.

The control device for releasing and actuating a sliding door is characterized more particularly in that it comprises a control plate mounted in a case and pivoted on the one hand to the fork end of a yoke pivoted in turn at its opposite end to said case, and on the other hand to a link adapted to move between the arms of said yoke and to connect said control plate to the lock control mechanism.

The control device according to this invention is further characterized in that a control means adapted to be disconnected from the lock is provided to permit the locking of said lock when the plate is in its open position.

A clearer understanding of this invention will be had as the following description proceeds with reference to the attached drawing illustrating diagrammatically by way of example a typical form of embodiment of the sliding door control device constituting the subject-matter thereof.

In the drawing:

FIG. 3 is a plane view from above of the control device of this invention, shown in its locking position at the end of the sliding movement of the door in the direction of the arrow F', the plate being still open.

Figure 1:
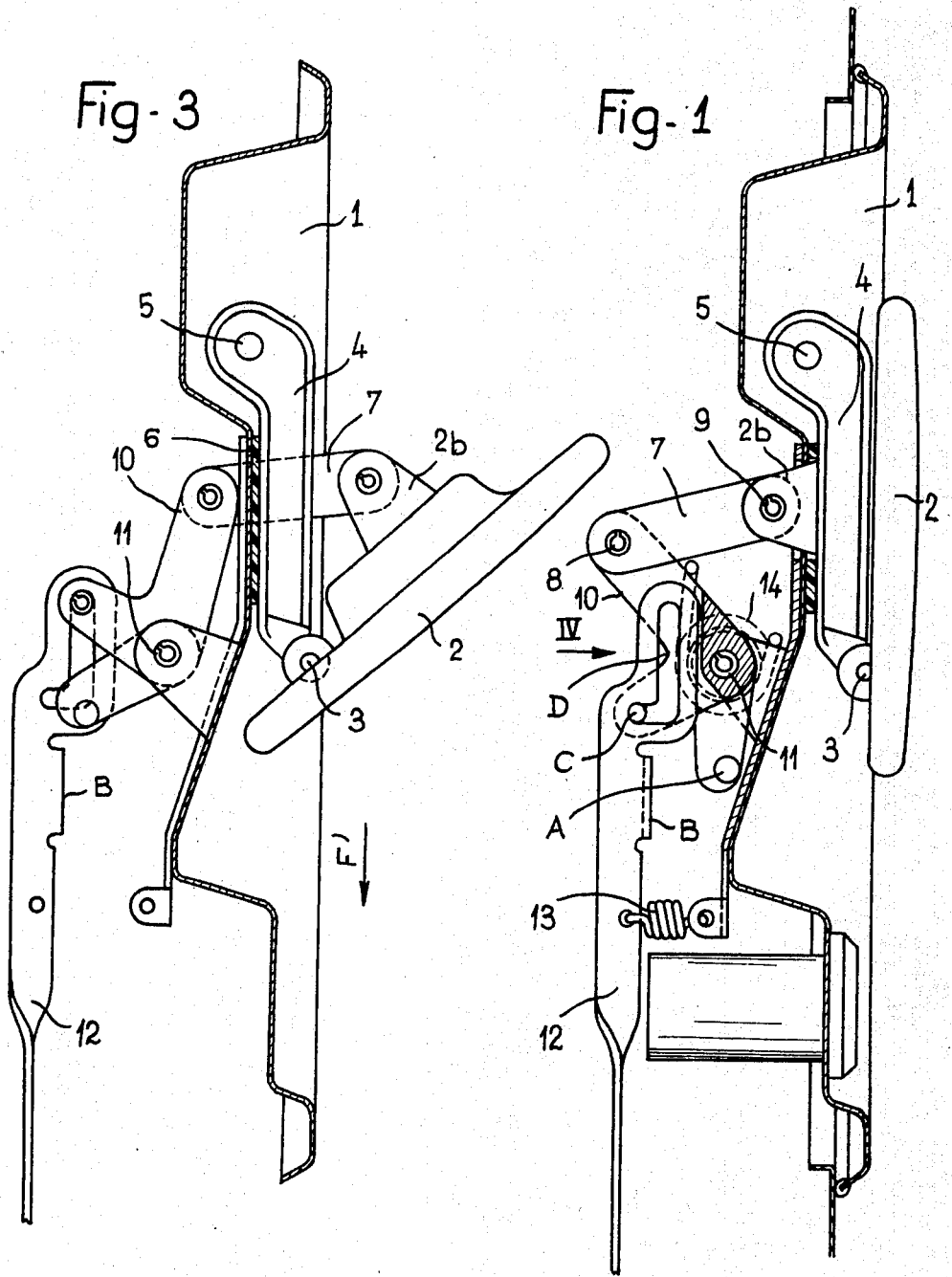
FIG. 1 is a plane view from above of the control device, shown in its inoperative position.

The control plate 2 flush-mounted in the case 1 is pivoted on the one hand at 3 to the fork portion of a yoke 4 and on the other hand at 9 to a link 7 by means of a bearing 2b rigid with said plate 2. The yoke 4, in the inoperative position and in its locking position, respectively, is substantially parallel to the plate 2 and bears against a seal 6. The yoke 4 is pivoted at 5 to the case 1. The link 7 connecting the plate 2 to the lock control mechanism is pivoted at 8 to one end of a bell-crank lever 10 fulcrumed to a pin 11 carrying a return spring 14. This bell-crank lever 10 has its other end pivoted to a link 12 by means of a stud C slidably engaging a bent or L-shaped elongated aperture D formed in one end of said link 12.

The bell-crank lever 10 when rotated about its pivot pin 11 by the link 7 causes the movement of translation of link 12 via the stud C retained by a traction spring 13 in the bottom of the small transverse portion of said bent or L-shaped elongated aperture D. When the link 12 completes its stroke the stud A rigid with bell-crank lever 10 engages a cam face B of link 12 so as to push the latter. Thus, the stud C engages the longitudinal portion of aperture D, thus permitting the return movement of link 12 to its initial position, due to the resilient return forces (not described) produced by the lock mechanism.

The device for controlling a left-hand or near-side lateral sliding door operates as follows:

In the inoperative position the plate 2 and yoke 4 engage each other, the yoke 4 bearing against the seal 6, and the link 12 is not actuated (see FIG. 1).

Figure 2:
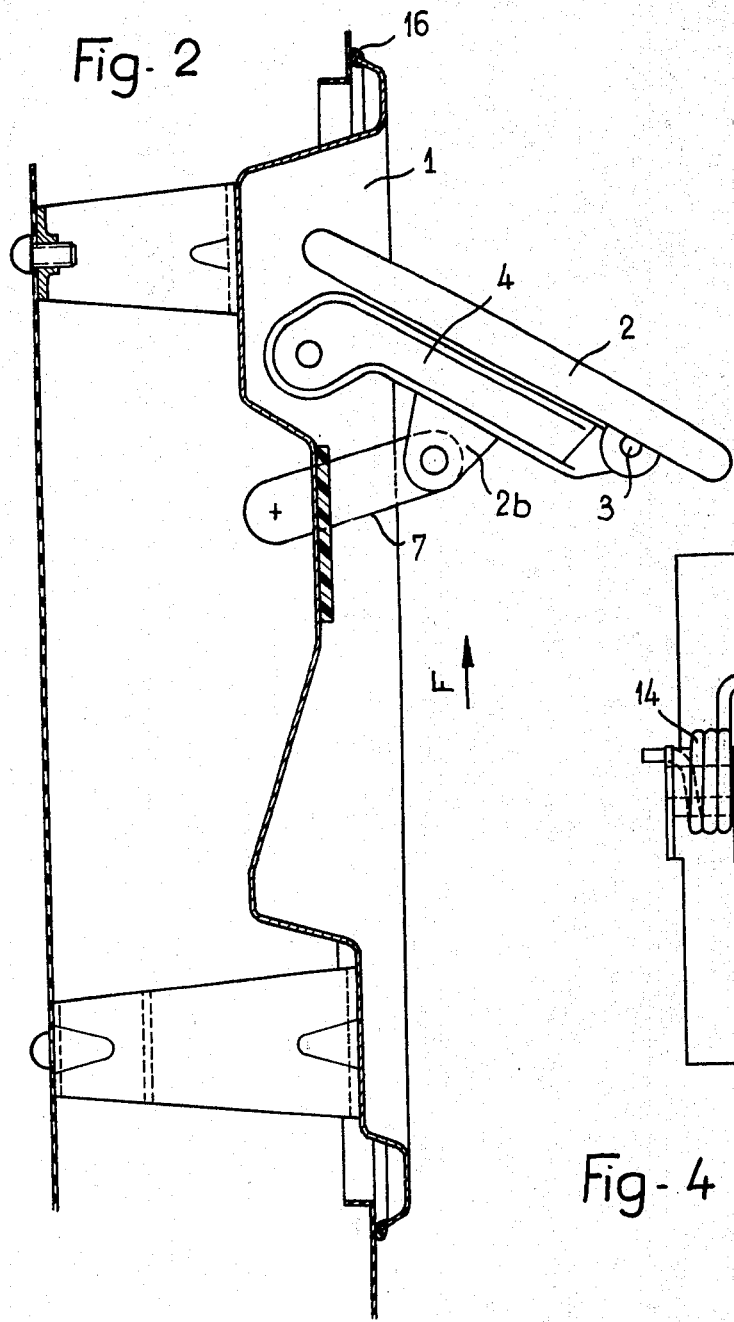
FIG. 2 is a fragmentary plane view from above of the control device of this invention, shown in the position permitting the release and sliding movement of the door in the direction of the arrow F.
Figure 4:
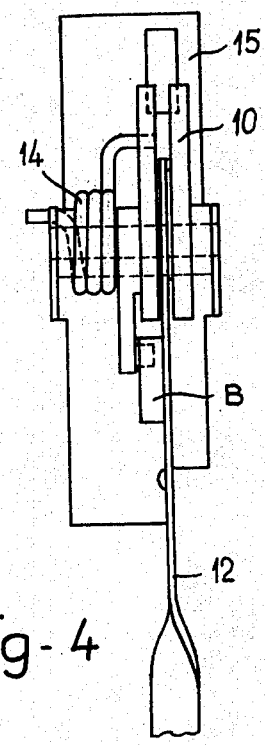
FIG. 4 is an elevational view from the rear of the control device, as seen in the direction of the arrow IV of FIG. 1.

In FIG. 2, the plate 2 is shown in its open position permitting on the one hand the release or unlocking of the door lock through the action of link 12, and on the other hand the sliding movement or translation of the door from left to right.

FIG. 3 shows the control plate 2 during its actuation for closing the door in the right to left direction. During each movement of rotation of the plate 2, the link 12 resumes its initial position (FIG. 1) due to the actions exerted by stud A on cam B and of stud C in the longitudinal portion of the elongated bent aperture D. This arrangement permits the locking of the door by means of its lock mechanism while the plate 2 is still open.

The control device according to this invention is intended notably but not exclusively for mounting on the lateral sliding doors of motor vehicles, such as delivery vans or the like.

Though a specific form of embodiment of this invention has been described hereinabove and illustrated in the accompanying drawing, it will readily occur to those conversant with the art that various modifications and changes may be brought thereto without departing from the scope of the invention as set forth in the appended claims.

What is claimed as new is:

1. In a control device for a sliding door: casing means for connection to said door, yoke means pivotally connected adjacent one end thereof to said casing means, handle means pivotally connected to said yoke means adjacent the other end thereof, a lock control mechanism, and linkage means interconnecting said handle means and said lock control mechanism, said linkage means comprising a link pivotally connected to said handle means and bell-crank lever means pivotally connected to said link, said lock control mechanism including a lever provided with a substantially L-shaped slot, said bell-crank lever means having a stud movably received in said slot, and a pin adapted to engage said lever, whereby, upon pivoting said handle means about its pivotal connection with said yoke means and upon pivoting of said handle means and yoke means about the pivotal connection of the latter with said casing means, respectively, said pin on said bell-crank lever means displaces said link to thereby permit said stud to move from one leg of said L-shaped slot to the other and permit movement of said door in one direction and the other direction respectively.

* * * * *